United States Patent
Chou et al.

(10) Patent No.: US 11,646,655 B2
(45) Date of Patent: May 9, 2023

(54) LLC RESONANT CONVERTER AND CONTROL METHOD THEREOF

(71) Applicant: Delta Electronics, Inc., Taoyuan (TW)

(72) Inventors: Ching-Ho Chou, Taoyuan (TW); Yung-Chuan Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 105 days.

(21) Appl. No.: 17/443,787

(22) Filed: Jul. 27, 2021

(65) Prior Publication Data
US 2022/0271655 A1  Aug. 25, 2022

(30) Foreign Application Priority Data
Feb. 19, 2021  (CN) .......................... 202110191619.5

(51) Int. Cl.
*H02M 3/00* (2006.01)
*H02M 1/00* (2006.01)
*H02M 3/335* (2006.01)

(52) U.S. Cl.
CPC .......... *H02M 3/01* (2021.05); *H02M 1/0009* (2021.05); *H02M 3/33571* (2021.05); *H02M 3/33573* (2021.05)

(58) Field of Classification Search
CPC ............... H02M 3/01; H02M 3/33571; H02M 3/33573; H02M 1/0009; H02M 1/08
USPC .......................................................... 363/17
See application file for complete search history.

(56) References Cited

U.S. PATENT DOCUMENTS

| | | | |
|---|---|---|---|
| 9,263,960 B2* | 2/2016 | Jovanović | H02M 1/10 |
| 10,159,125 B1 | 12/2018 | Chou | |
| 10,170,974 B1 | 1/2019 | Oh et al. | |
| 10,616,971 B1 | 4/2020 | Ajo et al. | |
| 2016/0049879 A1* | 2/2016 | Park | H05B 45/382 363/21.1 |

* cited by examiner

*Primary Examiner* — Yemane Mehari
(74) *Attorney, Agent, or Firm* — Kirton McConkie; Evan R. Witt

(57) ABSTRACT

A control method for an LLC resonant converter includes the following steps. Firstly, the LLC resonant converter is enabled. Then, the sonant converter is operated in a first modulation mode, so that the magnitude of the output voltage is greater than or equal to an intermediate voltage value. When the magnitude of the output current is greater than zero, a determining step is performed to determine whether the magnitude of the output voltage is greater than a reference voltage value. When the determining result is satisfied, the LLC resonant converter is operated in the first modulation mode. When the determining result is not satisfied, the LLC resonant converter is operated in a second modulation mode, so that the magnitude of the output voltage is lower than the intermediate voltage value.

10 Claims, 9 Drawing Sheets

LLC RESONANT CONVERTER AND CONTROL METHOD THEREOF

FIELD OF THE INVENTION

The present invention relates to a control method, and more particularly to an LLC resonant converter and a control method for the LLC resonant converter.

BACKGROUND OF THE INVENTION

Generally, the LLC resonant converters with zero voltage switching (ZVS) capabilities and zero current switching (ZCS) capabilities have been widely used in various electrical products. When the LLC resonant converter is applied to the circumstance requiring the constant voltage output, the use of LLC resonant converter can largely reduce the switching loss of the power switch and increase the efficiency of the power supply device.

FIG. 1 is a plot illustrating the relationship between the output voltage and the output current of the LLC resonant converter with the constant current output capability. As shown in FIG. 1, the LLC resonant converter is applied to the circumstance requiring the constant current output. For example, the LLC resonant converter is applied to a constant-current LED power supply device for driving a LED load. Since the LED load is changeable and the voltage regulations for different LED loads are usually different, LED power supply device usually has a wider output voltage range (e.g., the maximum voltage value of the output voltage is 2~4 times the minimum voltage value of the output voltage). Since the output voltage range is very wide, the control method of the LLC resonant converter in the constant-current LED power supply device is not suitably applied to the LLC resonant converter in the constant-voltage LED power supply device. That is, the LLC resonant converter for the constant-current LED power supply device cannot be always operated at the high-effective resonant frequency according to the voltage of the LED load. If the set value of the resonant frequency of the LLC resonant converter is related to a lower output voltage, the LLC resonant converter generates a large resonant current when the output voltage is increased. Under this circumstance, the efficiency of the LED power supply device is impaired.

Therefore, there is a need of providing an improved LLC resonant converter and a control method for the LLC resonant converter in order to overcome the drawbacks of the conventional technologies.

SUMMARY OF THE INVENTION

The present invention provides an LLC resonant converter and a control method for the LLC resonant converter. When the LLC resonant converter is applied to the circumstance requiring the constant current output, the efficiency is enhanced.

In accordance with an aspect of the present invention, a control method for an LLC resonant converter is provided. The LLC resonant converter receives an input voltage and provides an output voltage and an output current to a DC load. The output current has a fixed current value. A magnitude of the output voltage is in a range between a predetermined voltage value and N times the predetermined voltage value. The LLC resonant converter includes a voltage detector for detecting the output voltage and a current detector for detecting the output current. The control method includes the following steps. In a step (S10), the LLC resonant converter is enabled. In a step (S20), the LLC resonant converter is operated in a first modulation mode. The magnitude of the output voltage is greater than or equal to an intermediate voltage value. The intermediate voltage value is equal to a half of a sum of the predetermined voltage value and N times the predetermined voltage value. Then, a step (S30) is performed to determine whether a magnitude of the output current is greater than zero according to a detecting result of the current detector. In a step (S40), when a determining result of the step (S30) is not satisfied, the step (S20) is performed again. When the determining result of the step (S30) is satisfied, whether the magnitude of the output voltage is greater than a reference voltage value is determined according to a detecting result of the voltage detector. When a determining result of the step (S40) is satisfied, a step (S50) is performed to drive the LLC resonant converter to be operated in the first modulation mode, and the step (S30) is performed again. When the determining result of the step (S40) is not satisfied, a step (S60) is performed to drive the LLC resonant converter to be operated in a second modulation mode, so that the magnitude of the output voltage is lower than the intermediate voltage value. Then, the step (S30) is performed again.

In accordance with another aspect of the present invention, an LLC resonant converter is provided. The LLC resonant converter receives an input voltage and provides an output voltage and an output current to a DC load. The output current has a fixed current value. The LLC resonant converter includes a primary side circuit, an isolation transformer, a secondary side circuit and a control circuit. The isolation transformer includes a primary winding and a secondary winding, wherein the primary winding of the isolation transformer is electrically connected with the primary side circuit. The secondary side circuit includes a bridge rectifier circuit, a unidirectional power-controllable switch, a voltage detector and a current detector. The bridge rectifier circuit is electrically connected with the secondary winding and includes a plurality of diodes. The unidirectional power-controllable switch is electrically connected with one of the plurality of diodes in parallel. The voltage detector is configured to detect the output voltage. The current detector is configured to detect the output current. The control circuit is used for controlling an operation of the LLC resonant converter. After the LLC resonant converter is enabled, the control circuit drives the LLC resonant converter to be operated in a first modulation mode and turns on the unidirectional power-controllable switch, so that the secondary side circuit provides the output voltage. The magnitude of the output voltage is greater than or equal to an intermediate voltage value. The intermediate voltage value is equal to a half of a sum of a predetermined voltage value and N times the predetermined voltage value. When the LLC resonant converter is enabled and the LLC resonant converter is operated in the first modulation mode, the control circuit determines whether a magnitude of the output current is greater than zero according to a detecting result of the current detector. When the control circuit determines that the magnitude of the output current is not greater than zero, the control circuit drives the LLC resonant converter to be operated in the first modulation mode. When the control circuit determines that the magnitude of the output current is greater than zero, the control circuit determines whether the magnitude of the output voltage is greater than a reference voltage value according to a detecting result of the voltage detector. When the control circuit determines that the magnitude of the output voltage is greater than the reference voltage value, the control circuit drives the LLC resonant converter to be operated in the first modulation mode. When the control circuit determines that the magnitude of the output voltage is lower than or equal to the reference voltage value, the control circuit drives the LLC resonant converter to be operated in a second modulation mode, and the control circuit controls the unidirectional power-controllable switch to be turned off, so that the secondary side circuit provides the output voltage, wherein magnitude of the output voltage is lower than the intermediate voltage value.

In accordance with a further aspect of the present invention, an LLC resonant converter is provided. The LLC resonant converter receives an input voltage and provides an output voltage and an output current to a DC load. The output current has a fixed current value. The LLC resonant converter includes a primary side circuit, an isolation transformer, a secondary side circuit and a control circuit. The primary side circuit includes a switching circuit and a resonance circuit. The switching circuit receives the input voltage. The switching circuit is electrically connected with the resonance circuit. The switching circuit has a full-bridge circuit comprising four switches. The isolation transformer includes a primary winding and a secondary winding. The primary winding of the isolation transformer is electrically connected with the primary side circuit. The secondary side circuit includes a bridge rectifier circuit, a voltage detector and a current detector. The bridge rectifier circuit is electrically connected with the secondary winding. The voltage detector is configured to detect the output voltage. The current detector is configured to detect the output current. The control circuit is used for controlling an operation of the LLC resonant converter. After the LLC resonant converter is enabled, the control circuit drives the LLC resonant converter to be operated in a first modulation mode, and the control circuit controls switching actions of the four switches in the form of a full-bridge circuitry, so that the LLC resonant converter provides the output voltage. The magnitude of the output voltage is greater than or equal to an intermediate voltage value. The intermediate voltage value is equal to a half of a sum of a predetermined voltage value and N times the predetermined voltage value. When the LLC resonant converter is enabled and the LLC resonant converter is operated in the first modulation mode, the control circuit determines whether a magnitude of the output current is greater than zero according to a detecting result of the current detector. When the control circuit determines that the magnitude of the output current is not greater than zero, the control circuit drives the LLC resonant converter to be operated in the first modulation mode. When the control circuit determines that the magnitude of the output current is greater than zero, the control circuit determines whether the magnitude of the output voltage is greater than a reference voltage value according to a detecting result of the voltage detector. When the control circuit determines that the magnitude of the output voltage is greater than the reference voltage value, the control circuit drives the LLC resonant converter to be operated in the first modulation mode. When the control circuit determines that the magnitude of the output voltage is lower than or equal to the reference voltage value, the control circuit drives the LLC resonant converter to be operated in a second modulation mode, and the control circuit controls switching actions of the four switches in the form of a half-bridge circuitry, so that the LLC resonant converter provides the output voltage. The magnitude of the output voltage is lower than the intermediate voltage value.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
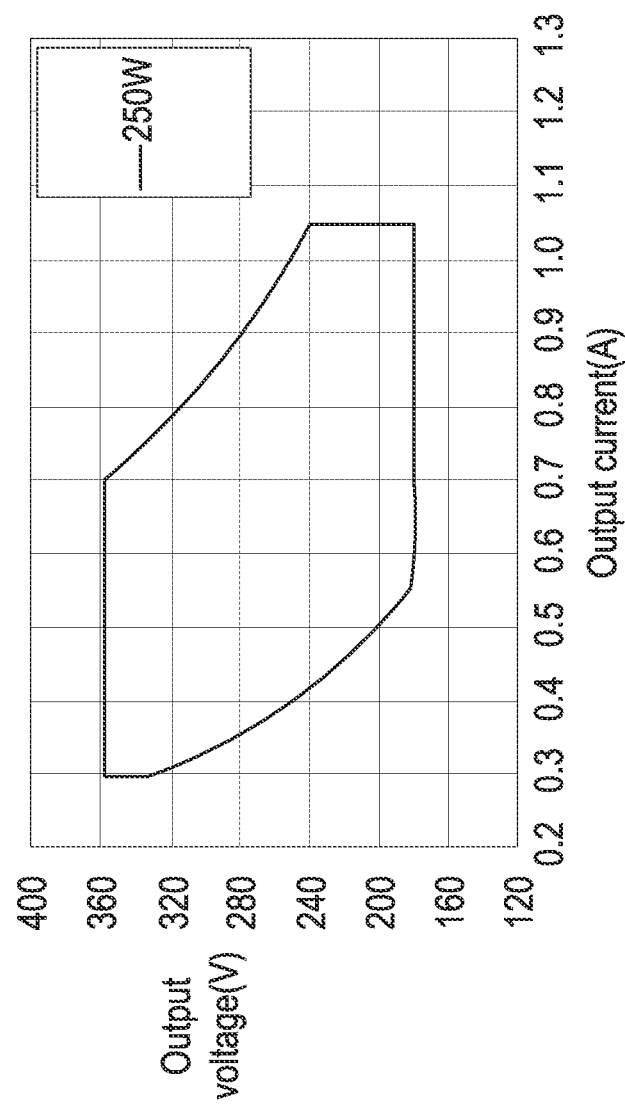
FIG. 1 is a plot illustrating the relationship between the output voltage and the output current of the LLC resonant converter with the constant current output capability.
Figure 2:
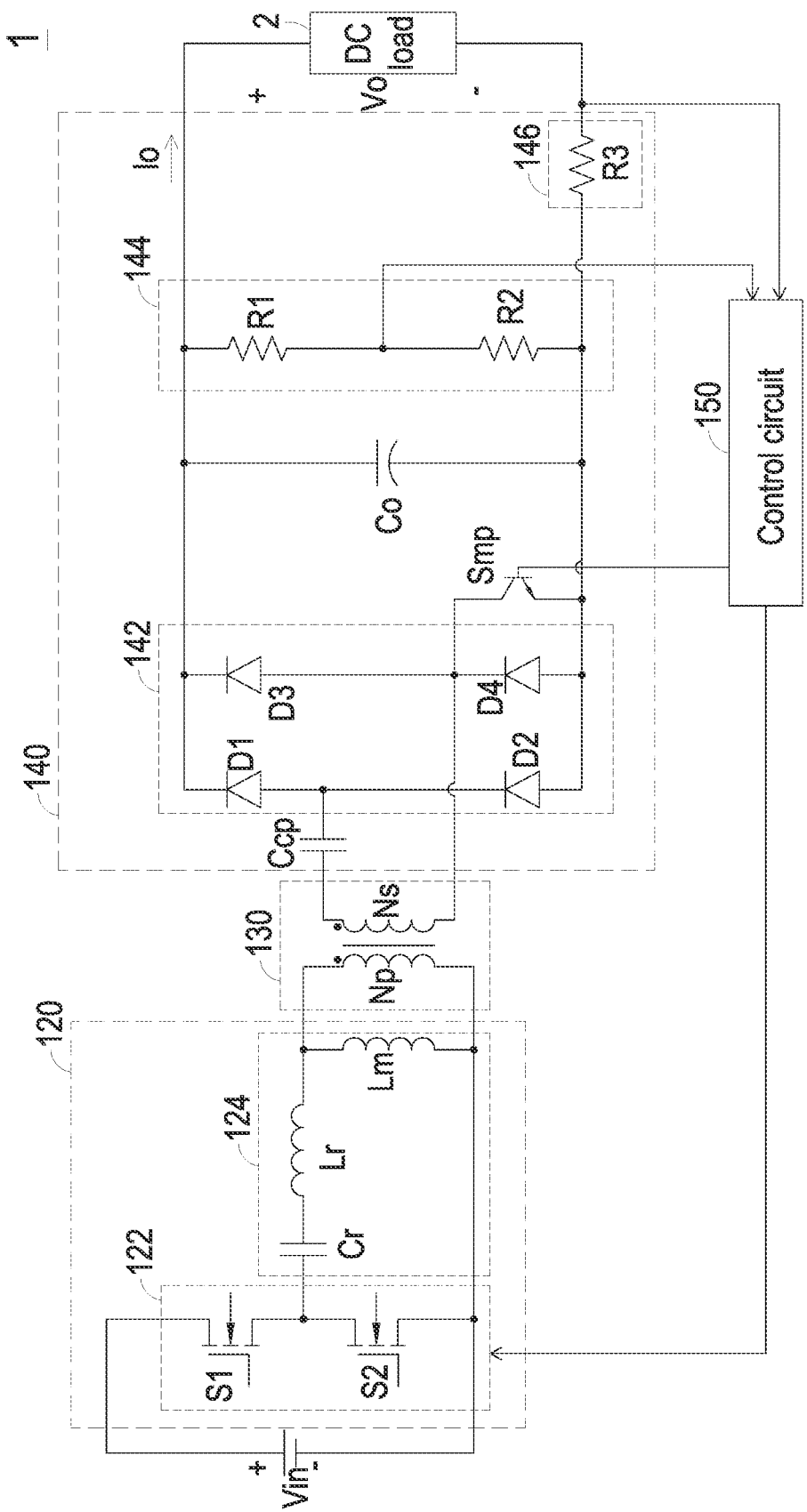
FIG. 2 is a schematic diagram illustrating the circuitry structure of an LLC resonant converter according to a first embodiment of the present invention.

FIG. 2 is a schematic diagram illustrating the circuitry structure of an LLC resonant converter according to a first embodiment of the present invention. As shown in FIG. 2, the LLC resonant converter 1 can be selectively in electric connection with a DC load 2. The LLC resonant converter 1 receives an input voltage Vin (i.e., DC voltage). After the input voltage Vin is converted by the LLC resonant converter 1, an output voltage Vo and an output current Io are provided to the DC load 2 to drive the DC load 2. The output current Io has a fixed current value. As mentioned above, the LLC resonant converter 1 is selectively in electric connection with the DC load 2. That is, when the DC load 2 is not electrically connected with the output terminal of the LLC resonant converter 1, the user may connect the DC load 2 with the output terminal of the LLC resonant converter 1. Otherwise, when the DC load 2 is electrically connected with the output terminal of the LLC resonant converter 1, the user may disconnect the DC load 2 from the output terminal of the LLC resonant converter 1. The LLC resonant converter 1 can be applied to a LED power supply device. For example, the DC load 2 includes at least one LED string or a plurality of serially-connected LED strings. However, the applications of the LLC resonant converter 1 and the constituents of the DC load 2 are not restricted. In the following embodiments, the DC load 2 includes at least one LED string. For complying with the number and type of the LED strings in the DC load 2, the LLC resonant converter 1 can provide the wide-range output voltage Vo to the DC load 2. Consequently, the output voltage Vo can comply with the voltage specification requirements of different DC loads. In an embodiment, the output voltage Vo is in the range between V1 and N×V1, wherein V1 is a predetermined voltage value, and N is a positive number larger than 1.5 and smaller than 4.

In an embodiment, the LLC resonant converter 1 includes a primary side circuit 120, an isolation transformer 130, a secondary side circuit 140 and a control circuit 150.

The primary side circuit 120 is electrically connected to a primary winding Np of the isolation transformer 130. The primary side circuit 120 receives the input voltage Vin and provides a primary current according to the input voltage Vin. The primary current flows through the primary winding Np. The primary side circuit 120 includes a switching circuit 122 and a resonance circuit 124. The switching circuit 122 is electrically connected with the resonance circuit 124. By the switching circuit 122, the input voltage Vin is converted into a high-frequency AC voltage and the high-frequency AC voltage is transmitted to the resonance circuit 124. In an embodiment, the switching circuit 122 has a half-bridge circuit. Consequently, the function of a half-bridge resonant converter can be implemented through the primary side circuit 120. The switching circuit 122 includes a switch S1 and a switch S2, which are electrically connected with each other in series. The switch S1 and the switch S2 are alternately turned on or turned off.

The resonance circuit 124 is electrically connected between the switching circuit 122 and the primary winding Np. The resonance circuit 124 receives the high-frequency AC voltage from the switching circuit 122, generates resonance and provides the primary current to the primary winding Np. In an embodiment, the resonance circuit 124 includes a resonance capacitor Cr, a resonance inductance Lr and a magnetizing inductance Lm. The resonance capacitor Cr and the resonance inductance Lr are serially connected with each other and connected with the primary winding Np of the isolation transformer 130. The magnetizing inductance Lm and the primary winding Np of the isolation transformer 130 are connected with each other in parallel. In an embodiment, the resonant inductance Lr and the magnetizing inductance Lm are magnetically integrated as the leakage inductor and the magnetizing inductor of the isolation transformer 130, respectively.

The primary winding Np of the isolation transformer 130 receives the primary current from the resonance circuit 124. Since the primary current flowing through the primary winding Np is induced by the secondary winding Ns of the isolation transformer 130, a secondary current is generated and outputted from the secondary winding Ns. In this way, the electric energy can be transferred through the primary side and the secondary side of the isolation transformer 130.

In an embodiment, the secondary side circuit 140 includes a bridge rectifier circuit 142, a unidirectional power-controllable switch Smp, an output capacitor Co, a charge pump capacitor Ccp, a voltage detector 144 and a current detector 146. The bridge rectifier circuit 142 is electrically connected with the secondary winding Ns. In an embodiment, the bridge rectifier circuit 142 includes a plurality of diodes D1~D4. The secondary current can be rectified by the bridge rectifier circuit 142 through the diodes D1~D4. The charge pump capacitor Ccp is electrically connected between the secondary winding Ns and the bridge rectifier circuit 142. The unidirectional power-controllable switch Smp is electrically connected with one of the plurality of diodes D1~D4 (e.g., the diode D4) of the bridge rectifier circuit 142 in parallel. The unidirectional power-controllable switch Smp can be selectively turned on or turned off. The output capacitor Co is electrically connected with the bridge rectifier circuit 142. The output capacitor Co provides the output voltage Vo according to the secondary current. The voltage detector 144 is electrically connected with the output terminal of the LLC resonant converter 1. After the output voltage Vo from the output terminal of the LLC resonant converter 1 is detected by the voltage detector 144, the detecting result is transmitted from the voltage detector 144 to the control circuit 150. In an embodiment, the voltage detector 144 is a voltage divider including two resistors R1 and R2, which are connected with each other in series. The current detector 146 is electrically connected with the output terminal of the LLC resonant converter 1. After the output current Io from the output terminal of the LLC resonant converter 1 is detected by the current detector 146, the detecting result is transmitted from the current detector 146 to the control circuit 150. In an embodiment, the current detector 146 includes a resistor R3. It is noted that the example of the current detector 146 is not restricted. For example, in another embodiment, the current detector 146 includes a current transformer.

In an embodiment, the unidirectional power-controllable switch Smp is a npn bipolar junction transistor. The emitter of the bipolar junction transistor is electrically connected with the anode of the diode D4. The collector of the bipolar junction transistor is electrically connected with the cathode of the bipolar junction transistor. In an embodiment, the unidirectional power-controllable switch Smp and the diode D4 of the bridge rectifier circuit 142 are in inverse-parallel connection. It is noted that the unidirectional power-controllable switch Smp is not restricted to the npn bipolar junction transistor. For example, in another embodiment, the unidirectional power-controllable switch Smp is a pnp bipolar junction transistor (BJT), an insulated gate bipolar transistor (IGBT) or a silicon controlled rectifier (SCR).

In accordance with a feature of the present invention, the operation mode of the secondary side circuit 140 can be determined according to the on/off states of the unidirectional power-controllable switch Smp. When the unidirectional power-controllable switch Smp is turned on, the secondary side circuit 140 is operated in a voltage-double rectifying mode. Consequently, the magnitude of the output voltage Vo from the secondary side circuit 140 is greater than or equal to an intermediate voltage value. The intermediate voltage value is equal to $\frac{1}{2} \times (1+N) \times V1$, wherein V1 is the predetermined voltage value. When the unidirectional power-controllable switch Smp is turned off, the secondary side circuit 140 is operated in a full-bridge rectifying mode. Consequently, the magnitude of the output voltage Vo from the secondary side circuit 140 is lower than the intermediate voltage value.

The control circuit 150 is used to control the operations of the LLC resonant converter 1. After the LLC resonant converter 1 is enabled, the control circuit 150 controls the LLC resonant converter 1 to be operated in the first modulation mode. That is, the unidirectional power-controllable switch Smp is turned on under control of the control circuit 150. Consequently, the magnitude of the output voltage Vo from the secondary side circuit 140 is greater than or equal to the intermediate voltage value. In other words, the magnitude of the output voltage Vo is at least two times the magnitude of the predetermined voltage value. Since the LLC resonant converter 1 is operated in the first modulation mode when the LLC resonant converter 1 is enabled, the magnitude of the output voltage Vo from the secondary side circuit 140 is at least two times the magnitude of the predetermined voltage value. When the DC load 2 is connected with the output terminal of the LLC resonant converter 1, the LLC resonant converter 1 can immediately drive the illumination of the DC load 2 regardless of whether the DC load 2 is driven in response to the high voltage or the low voltage.

When the LLC resonant converter 1 is enabled and the LLC resonant converter 1 is operated in the first modulation mode, the control circuit 150 determines whether the output current Io is greater than zero according to the detecting result of the current detector 146 in order to determine whether the output terminal of the LLC resonant converter 1 is electrically connected with the DC load 2. When the control circuit 150 determines that the output current Io is not greater than zero, it means that the output terminal of the LLC resonant converter 1 is not connected with any DC load 2. Under this circumstance, the LLC resonant converter 1 is operated in the first modulation mode under control of the control circuit 150, and the magnitude of the output voltage Vo from the secondary side circuit 140 is greater than or equal to the intermediate voltage value. Consequently, whenever the DC load 2 is connected with the output terminal of the LLC resonant converter 1, the LLC resonant converter 1 can drive the illumination of the DC load 2.

Whereas, when the control circuit 150 determines that the output current Io is greater than zero, it means that the output terminal of the LLC resonant converter 1 is connected with the DC load 2. Then, it is necessary to determine whether the DC load 2 is driven in response to the high voltage or the low voltage. Consequently, the output voltage Vo from the LLC resonant converter 1 can be dynamically adjusted, and the LLC resonant converter 1 can be operated at the high-effective resonant frequency. In an embodiment, the control circuit 150 determines whether the magnitude of the output voltage Vo is greater than a reference voltage value according to the detecting result of the voltage detector 144. When the detecting result of the voltage detector 144 indicates that the magnitude of the output voltage Vo is greater than the reference voltage value, it means that the DC load 2 needs to be driven in response to the high voltage. Under this circumstance, the LLC resonant converter 1 is operated in the first modulation mode under control of the control circuit 150, and the magnitude of the output voltage Vo from the secondary side circuit 140 is greater than or equal to the intermediate voltage value. Whereas, when the detecting result of the voltage detector 144 indicates that the magnitude of the output voltage Vo is lower than or equal to the reference voltage value, it means that the DC load 2 needs to be driven in response to the low voltage. Under this circumstance, the LLC resonant converter 1 is operated in the second modulation mode under control of the control circuit 150. Meanwhile, the unidirectional power-controllable switch Smp is turned off under control of the control circuit 150, and thus the magnitude of the output voltage Vo from the secondary side circuit 140 is lower than the intermediate voltage value.

As mentioned above, the control circuit 150 determines whether the magnitude of the output voltage Vo is greater than the reference voltage value according to the detecting result of the voltage detector 144. According to the result of comparing the output voltage Vo with the reference voltage value, the control circuit 150 realizes whether the DC load 2 is driven in response to the high voltage or the low voltage. Consequently, the operation mode of the LLC resonant converter 1 is selectively operated in the first modulation mode or the second modulation mode. Since the LLC resonant converter 1 is operated at the high-effective resonant frequency, the efficiency of the LLC resonant converter 1 in the wide output voltage range is enhanced.

In some embodiments, the control circuit 150 provides an over-voltage protection mechanism according to the detecting result of the voltage detector 144, and the control circuit 150 provides an over-current protection mechanism according to the detecting result of the current detector 146. The over-voltage protection mechanism and the over-current protection mechanism are well known to those skilled in the art, and not redundantly described herein.

The control circuit 150 can control the operations of the primary side circuit 120. Preferably but not exclusively, the control circuit 150 is a microprocessor.

Figure 3:
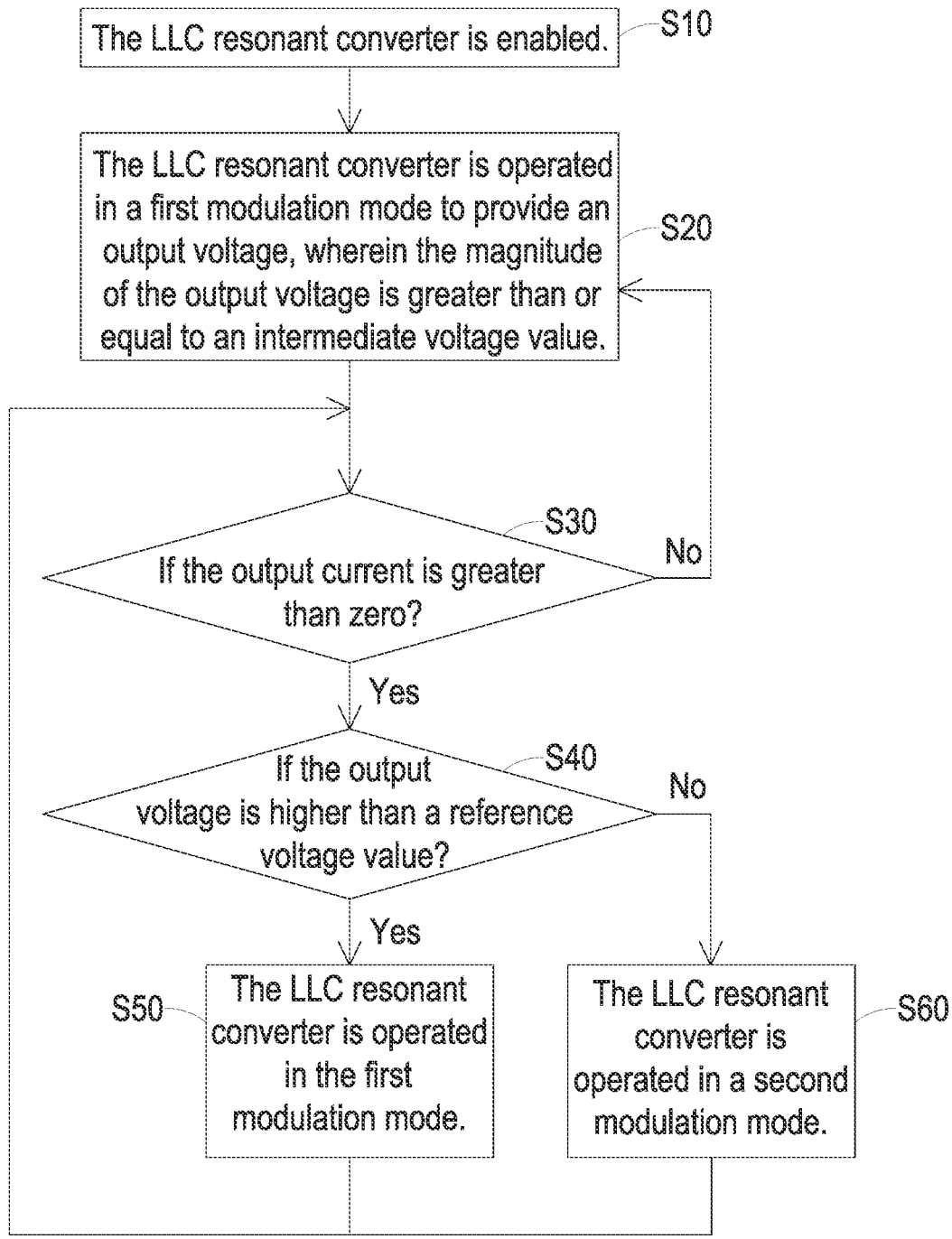
FIG. 3 is a flowchart illustrating a control method for an LLC resonant converter according to an embodiment of the present invention.

FIG. 3 is a flowchart illustrating a control method for an LLC resonant converter according to an embodiment of the present invention. The control method is implemented by the control circuit 150 of the LLC resonant converter 1. The control method includes the following steps.

In a step S10, the LLC resonant converter 1 is enabled.

In a step S20, the LLC resonant converter 1 is operated in a first modulation mode to provide an output voltage Vo, wherein the magnitude of the output voltage Vo is greater than or equal to an intermediate voltage value. The intermediate voltage value is equal to $\frac{1}{2} \times (1+N) \times V1$, wherein V1 is the predetermined voltage value, and N is a positive number larger than 1.5 and smaller than 4.

After the step S20, a step S30 is performed to determine whether the output current Io is greater than zero according to the detecting result of the current detector 146. When the determining result of the step S30 indicates that the output current Io is not greater than zero, the step S20 is performed. Whereas, when the determining result of the step S30 indicates that the output current Io is greater than zero, a step S40 is performed.

In the step S40, the control circuit 150 determines whether the magnitude of the output voltage Vo is greater than a reference voltage value according to the detecting result of the voltage detector 144. When the determining result of the step S40 indicates that the magnitude of the output voltage Vo is greater than the reference voltage value, a step S50 is performed. Whereas, when the determining result of the step S40 indicates that the magnitude of the output voltage Vo is not greater than the reference voltage value, a step S60 is performed.

In the step S50, the LLC resonant converter 1 is operated in the first modulation mode. Then, the step S30 is performed again.

In the step S60, the LLC resonant converter 1 is operated in a second modulation mode to provide the output voltage Vo, wherein the magnitude of the output voltage Vo is lower than the intermediate voltage value. Then, the step S30 is performed again.

In the step S20 or the step S50, the unidirectional power-controllable switch Smp of the secondary side circuit 140 is turned on under control of the control circuit 150. Consequently, the magnitude of the output voltage Vo from the secondary side circuit 140 is greater than or equal to the intermediate voltage value. In the step S60, the unidirectional power-controllable switch Smp of the secondary side circuit 140 is turned off under control of the control circuit 150. Consequently, the magnitude of the output voltage Vo from the secondary side circuit 140 is lower than the intermediate voltage value.

The output voltage Vo and the output current Io of the LLC resonant converter 1 in different operation modes will be illustrated with reference to FIGS. 4A to 4E. FIGS. 4A to 4E are schematic plots illustrating the relationships between the output voltage and the output current of the LLC resonant converter in different operation modes.

Figure 4A:
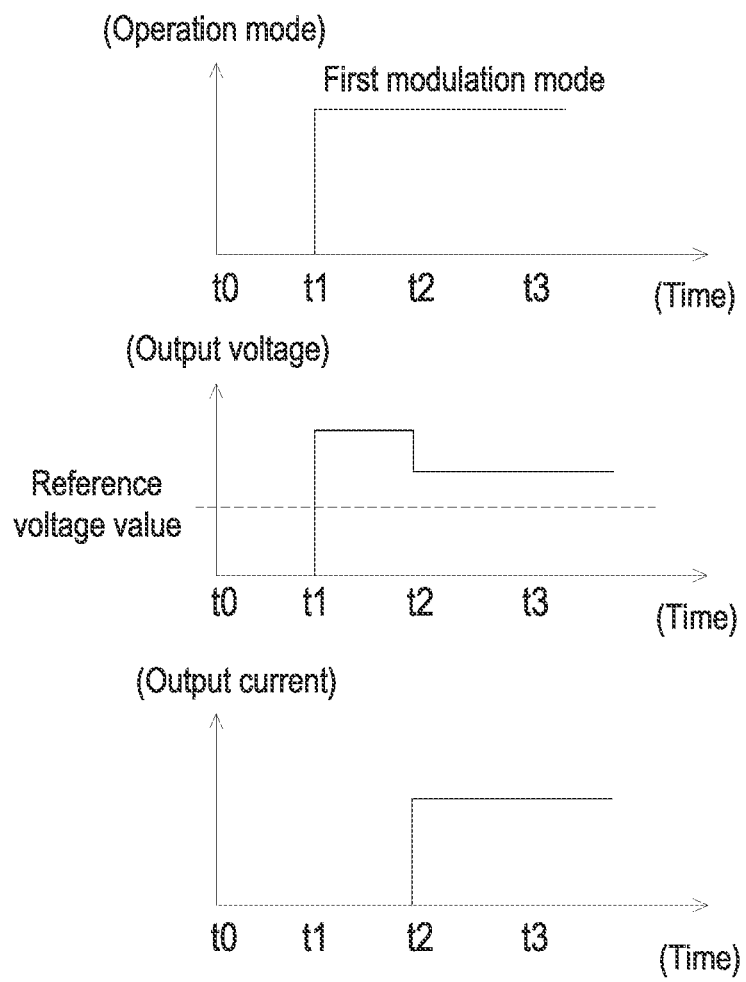
FIGS. 4A to 4E are schematic plots illustrating the relationships between the output voltage and the output current of the LLC resonant converter in different operation modes.

Please refer to FIGS. 2, 3 and 4A to 4E. In the situation of FIG. 4A, the output terminal of the LLC resonant converter 1 is connected with a DC load 2 that is driven in response to a high voltage. At the time point t1, the LLC resonant converter 1 is started, and the LLC resonant converter 1 is operated in the first modulation mode. At the time point t2, the control circuit 150 determines that the output current Io is greater than zero according to the detecting result of the current detector 146, and the control circuit 150 determines that the magnitude of the output voltage Vo is greater than the reference voltage value according to the detecting result of the voltage detector 144. Consequently, the LLC resonant converter 1 is driven to be maintained in the first modulation mode under control of the control circuit 150. In the time interval between the time point t1 and the time point t2, the control circuit 150 enables the over-voltage protection mechanism. Consequently, the output voltage Vo is maintained in an over-voltage protection level. The over-voltage protection mechanism is also applied to the situations of FIGS. 4B to 4E, and not redundantly described herein.

Figure 4B:
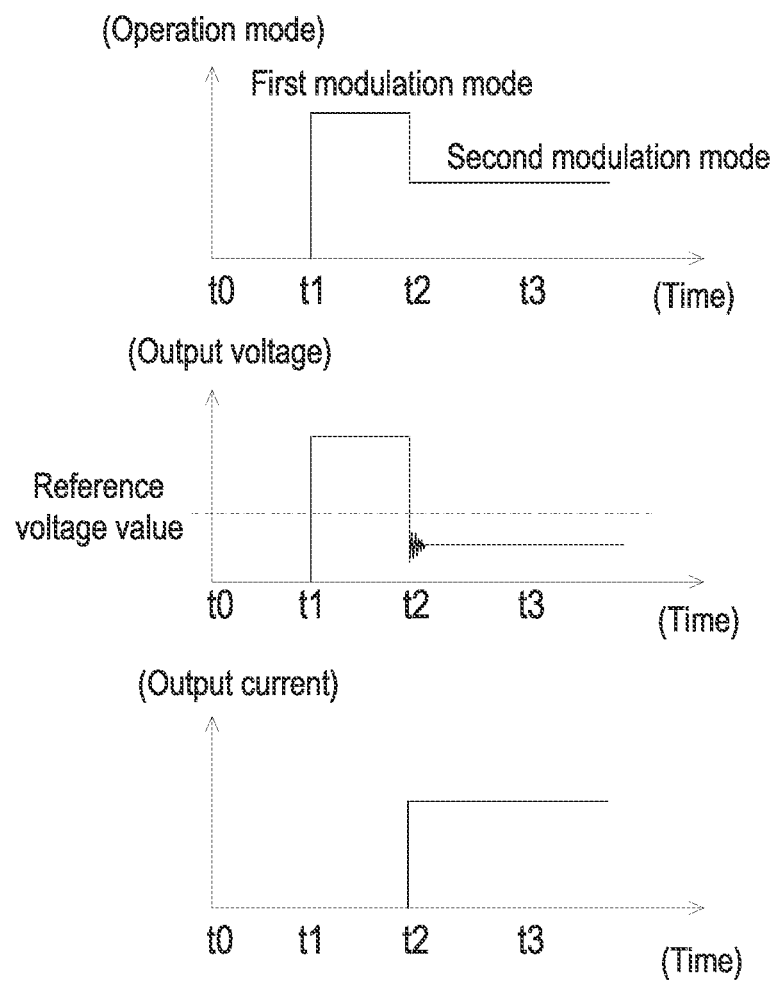

In the situation of FIG. 4B, the output terminal of the LLC resonant converter 1 is connected with a DC load 2 that is driven in response to a low voltage. At the time point t1, the LLC resonant converter 1 is started, and the LLC resonant converter 1 is operated in the first modulation mode. At the time point t2, the control circuit 150 determines that the output current Io is greater than zero according to the detecting result of the current detector 146, and the control circuit 150 determines that the magnitude of the output voltage Vo is not greater than the reference voltage value according to the detecting result of the voltage detector 144. Consequently, the LLC resonant converter 1 is driven to be maintained in the second modulation mode under control of the control circuit 150.

Figure 4C:
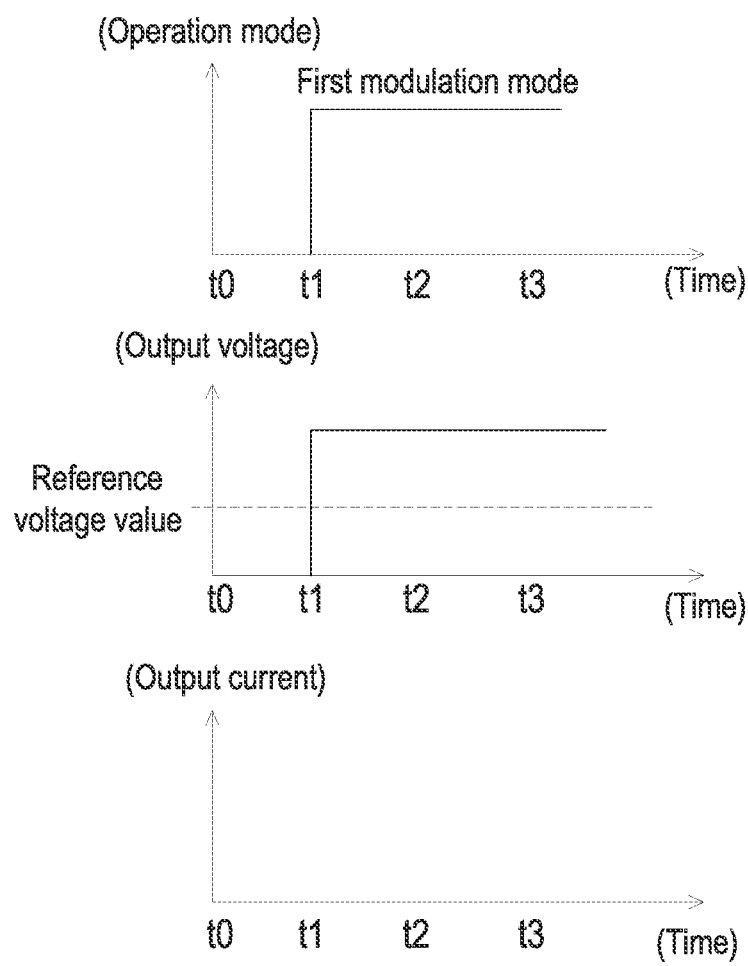

In the situation of FIG. 4C, the output terminal of the LLC resonant converter 1 is not connected with any DC load 2. At the time point t1, the LLC resonant converter 1 is started, and the LLC resonant converter 1 is operated in the first modulation mode. At the time point t2, the control circuit 150 determines that the output current Io is not greater than zero according to the detecting result of the current detector 146. Consequently, the LLC resonant converter 1 is driven to be maintained in the first modulation mode under control of the control circuit 150. Under this circumstance, the LLC resonant converter 1 is in a ready state to be connected with the DC load 2.

Figure 4D:
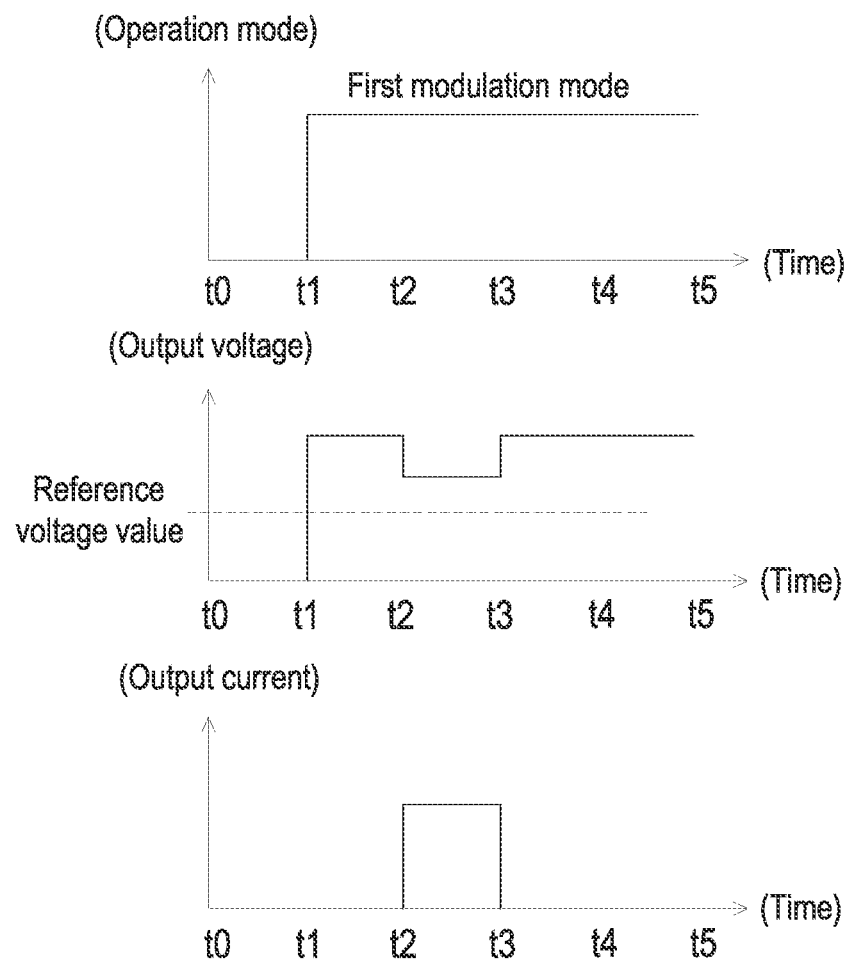

In the situation of FIG. 4D, the output terminal of the LLC resonant converter 1 is connected with a DC load 2 that is driven in response to the high voltage. The situation of FIG. 4D before the time point t3 is similar to the situation of FIG. 4A, and not redundantly described herein. At the time point t3, the output terminal of the LLC resonant converter 1 is no longer connected with the DC load 2. Meanwhile, the control circuit 150 determines that the output current Io is not greater than zero according to the detecting result of the current detector 146. Consequently, the LLC resonant converter 1 is driven to be maintained in the first modulation mode under control of the control circuit 150. In addition, the control circuit 150 enables the over-voltage protection mechanism. Consequently, the output voltage Vo is maintained in the over-voltage protection level.

Figure 4E:
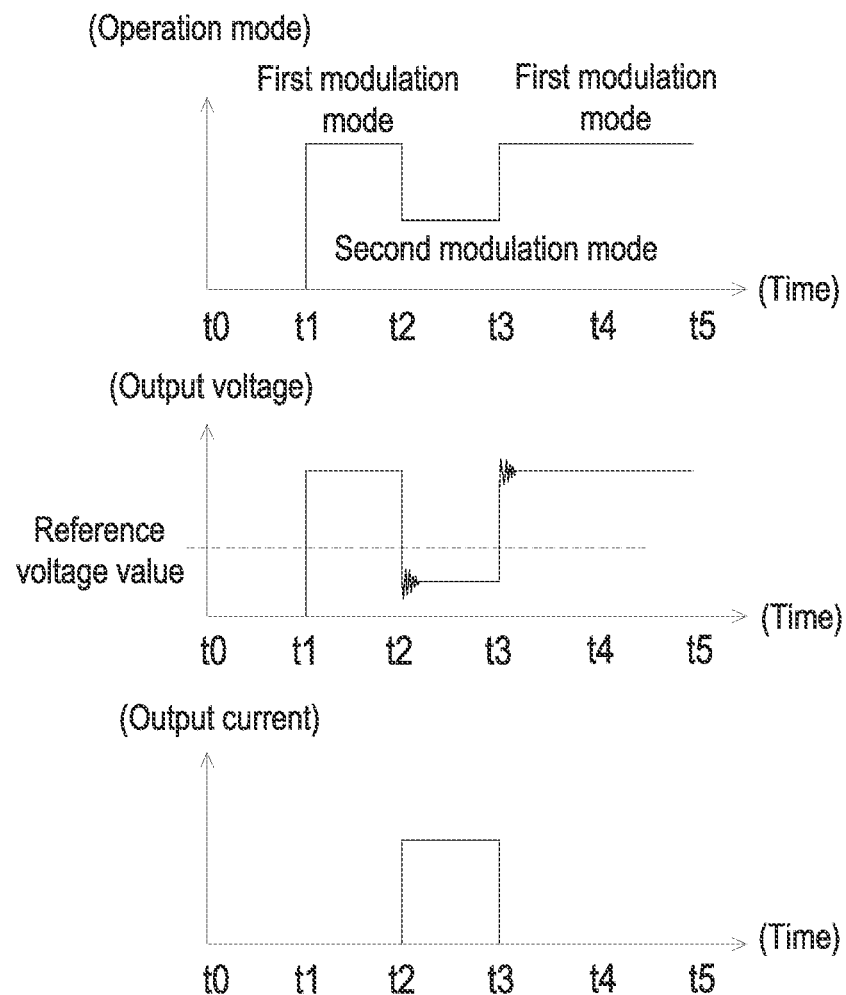

In the situation of FIG. 4E, the output terminal of the LLC resonant converter 1 is connected with a DC load 2 that is driven in response to the low voltage. The situation of FIG. 4E before the time point t3 is similar to the situation of FIG. 4B, and not redundantly described herein. At the time point t3, the output terminal of the LLC resonant converter 1 is no longer connected with the DC load 2. Meanwhile, the control circuit 150 determines that the output current Io is not greater than zero according to the detecting result of the current detector 146. Consequently, the operation mode of the LLC resonant converter 1 is switched from the second modulation mode to the first modulation mode under control of the control circuit 150. In addition, the control circuit 150 enables the over-voltage protection mechanism. Consequently, the output voltage Vo is maintained in the over-voltage protection level.

Figure 5:
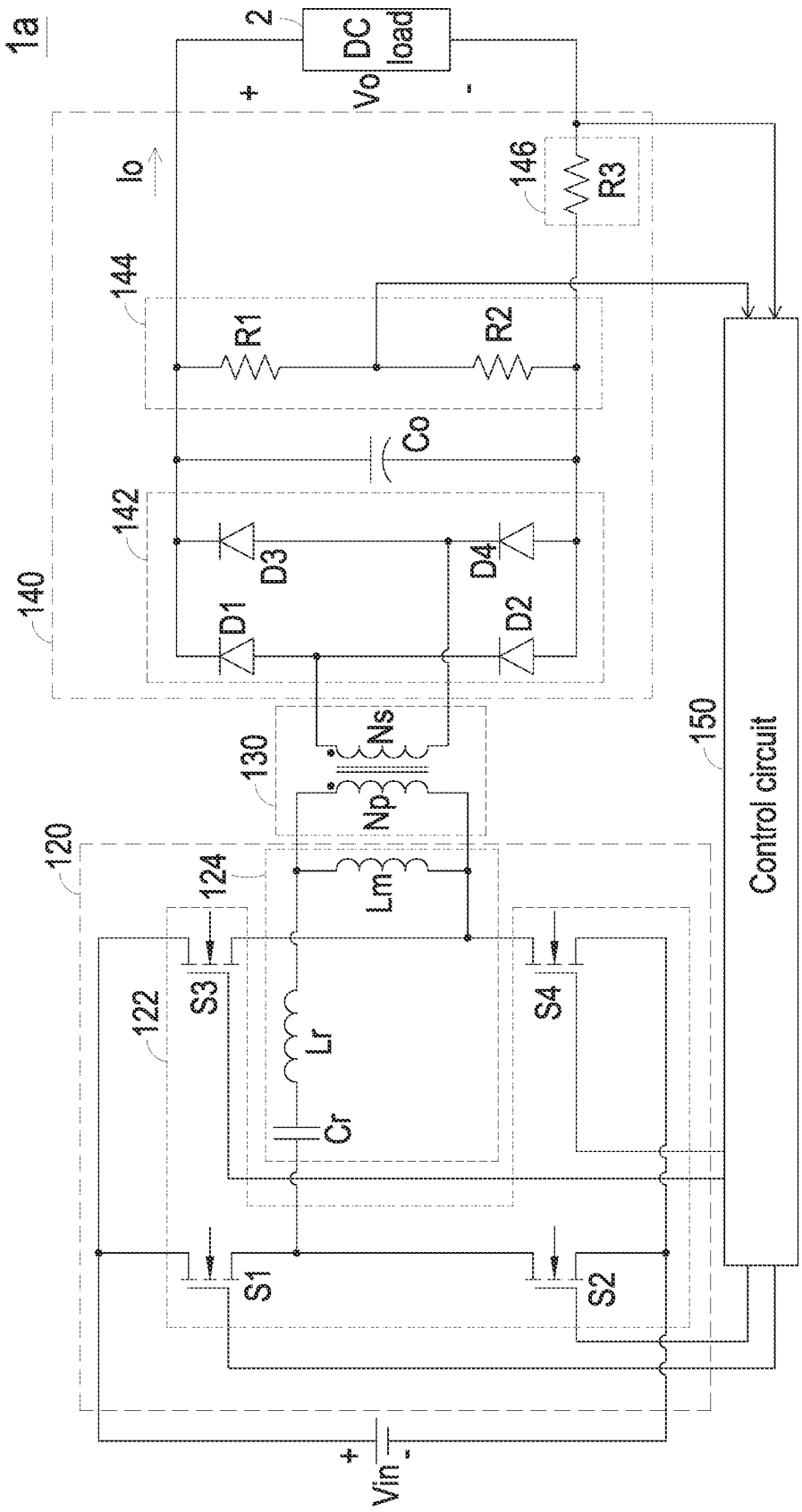
FIG. 5 is a schematic diagram illustrating the circuitry structure of an LLC resonant converter according to a second embodiment of the present invention.

FIG. 5 is a schematic diagram illustrating the circuitry structure of an LLC resonant converter according to a second embodiment of the present invention. The magnitude of the output current Io from the LLC resonant converter 1$a$ is a fixed value. In an embodiment, the output voltage Vo is in the range between V1 and N×V1, wherein V1 is a predetermined voltage value, and N is a positive number larger than 1.5 and smaller than 4. The circuitry structure of the LLC resonant converter 1$a$ is similar to that of the LLC resonant converter 1 as shown in FIG. 2. Component parts and elements corresponding to those of the first embodiment are designated by identical numeral references, and detailed descriptions thereof are omitted. In comparison with the first embodiment, the circuitry structure of the secondary side circuit 140 of the LLC resonant converter 1$a$ is distinguished. The secondary side circuit 140 of the LLC resonant converter 1$a$ includes the bridge rectifier circuit 142, the output capacitor Co, the voltage detector 144 and the current detector 146, but the unidirectional power-controllable switch Smp of FIG. 2 is omitted. Consequently, regardless of whether the LLC resonant converter 1$a$ is in the first modulation mode or the second modulation mode under control of the control circuit 150, the secondary side circuit 140 is operated in the full-bridge rectifying mode.

In this embodiment, the switching circuit 122 of the primary side circuit 120 of the he LLC resonant converter 1$a$ has a full-bridge circuit. Consequently, the function of a full-bridge resonant converter can be implemented through the primary side circuit 120. The switching circuit 122 comprises a first bridge arm and a second bridge arm. The first bridge arm comprises switches S1 and S2 connected in serial. The second bridge arm comprises switches S3 and S4 connected in serial.

When the LLC resonant converter 1$a$ is operated in the first modulation mode under control of the control circuit 150, the control circuit 150 controls the switching actions of the switches S1, S2, S3 and S4 of the switching circuit 122 in the form of a full-bridge circuitry. Consequently, the primary side circuit 120 becomes a full-bridge resonant circuit. The primary side circuit 120 receives the input voltage Vin and provides a primary current according to the input voltage Vin. The primary current flows through the primary winding Np. Consequently, the magnitude of the output voltage Vo from the secondary side circuit 140 is greater than or equal to an intermediate voltage value. The intermediate voltage is equal to ½×(1+N)×V1, wherein V1 is the predetermined voltage value.

When the LLC resonant converter 1$a$ is operated in the second modulation mode under control of the control circuit 150, the control circuit 150 controls the switching actions of the switches S1, S2, S3 and S4 of the switching circuit 122 in the form of a half-bridge circuitry. For example, the switch S2 and the switch S3 are continuously turned off, and the switch S1 and the switch S4 are alternately turned on or turned off. Consequently, the primary side circuit 120 becomes a half-bridge resonant circuit. The primary side circuit 120 provides a primary current according to a half of the input voltage Vin. The primary current flows through the primary winding Np. Consequently, the magnitude of the output voltage Vo from the secondary side circuit 140 is lower than the intermediate voltage value.

The control method as shown in FIG. 3 is still applied to the LLC resonant converter 1a as shown in FIG. 5. The secondary side circuit 140 of the LLC resonant converter 1a is not equipped with the unidirectional power-controllable switch Smp (as shown in FIG. 2). The switching circuit 122 of the primary side circuit 120 of the LLC resonant converter 1a has the full-bridge circuit. In some embodiments, in the step S20 or the step S50, the control circuit 150 controls the switching actions of the switches S1, S2, S3 and S4 of the switching circuit 122 in the form of the full-bridge circuitry. Consequently, the magnitude of the output voltage Vo is greater than or equal to the intermediate voltage value. In the step S60, the control circuit 150 controls the switching actions of the switches S1, S2, S3 and S4 of the switching circuit 122 in the form of the half-bridge circuitry. Consequently, the magnitude of the output voltage Vo is lower than the intermediate voltage value.

From the above descriptions, the present invention provides the LLC resonant converter and the control method for the LLC resonant converter. The control circuit determines whether the magnitude of the output voltage is greater than the reference voltage value according to the detecting result of the voltage detector. According to the result of comparing the output voltage with the reference voltage value, the control circuit realizes whether the DC load is driven in response to the high voltage or the low voltage. Consequently, the operation mode of the LLC resonant converter is selectively operated in the first modulation mode or the second modulation mode. Since the LLC resonant converter is operated at the high-effective resonant frequency, the efficiency of the LLC resonant converter in the wide output voltage range is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for an LLC resonant converter, the LLC resonant converter receiving an input voltage and providing an output voltage and an output current to a DC load, the output current having a fixed current value, a magnitude of the output voltage being in a range between a predetermined voltage value and N times the predetermined voltage value, the LLC resonant converter comprising a voltage detector for detecting the output voltage and a current detector for detecting the output current, the control method comprising steps of:
    (S10) enabling the LLC resonant converter;
    (S20) driving the LLC resonant converter to be operated in a first modulation mode, so that the magnitude of the output voltage is greater than or equal to an intermediate voltage value, wherein the intermediate voltage is equal to a half of a sum of the predetermined voltage value and N times the predetermined voltage value;
    (S30) determining whether a magnitude of the output current is greater than zero according to a detecting result of the current detector;
    (S40) when a determining result of the step (S30) is not satisfied, the step (S20) is performed again, and when the determining result of the step (S30) is satisfied, determining whether the magnitude of the output voltage is greater than a reference voltage value according to a detecting result of the voltage detector;
    (S50) when a determining result of the step (S40) is satisfied, driving the LLC resonant converter to be operated in the first modulation mode, and performing the step (S30) again; and
    (S60) when the determining result of the step (S40) is not satisfied, driving the LLC resonant converter to be operated in a second modulation mode, and performing the step (S30) again, wherein in the second modulation mode, the magnitude of the output voltage is lower than the intermediate voltage value.

2. The control method according to claim 1, wherein N is a positive number larger than 1.5 and smaller than 4.

3. The control method according to claim 1, wherein the LLC resonant converter comprises:
    a primary side circuit;
    an isolation transformer comprising a primary winding and a secondary winding, wherein the primary winding of the isolation transformer is electrically connected with the primary side circuit; and
    a secondary side circuit comprising a bridge rectifier circuit, a unidirectional power-controllable switch, the voltage detector and the current detector, wherein the bridge rectifier circuit comprises a plurality of diodes, and the unidirectional power-controllable switch is electrically connected with one of the plurality of diodes in parallel.

4. The control method according to claim 3, wherein each of the step (S20) and the step (S50) further comprises a sub-step of turning on the unidirectional power-controllable switch, so that the secondary side circuit provides the output voltage, wherein the magnitude of the output voltage is greater than or equal to the intermediate voltage value.

5. The control method according to claim 3, wherein the step (S60) further comprises a sub-step of turning off the unidirectional power-controllable switch, so that the secondary side circuit provides the output voltage, wherein the magnitude of the output voltage is lower than the intermediate voltage value.

6. The control method according to claim 1, wherein the LLC resonant converter comprises:
    a primary side circuit comprising a switching circuit and a resonance circuit, wherein the switching circuit receives the input voltage, and the switching circuit is electrically connected with the resonance circuit, wherein the switching circuit has a full-bridge circuit comprising four switches;
    an isolation transformer comprising a primary winding and a secondary winding, wherein the primary winding of the isolation transformer is electrically connected with the primary side circuit; and
    a secondary side circuit comprising a bridge rectifier circuit, the voltage detector and the current detector.

7. The control method according to claim 6, wherein each of the step (S20) and the step (S50) further comprises a sub-step of controlling switching actions of the four switches in a form of a full-bridge circuitry, so that the primary side circuit is formed as a full-bridge resonant circuit and the LLC resonant converter provides the output voltage, wherein the magnitude of the output voltage is greater than or equal to the intermediate voltage value.

8. The control method according to claim 6, wherein the step (S60) further comprises a sub-step of controlling switching actions of the four switches in a form of a half-bridge circuitry, so that the primary side circuit is formed as a half-bridge resonant circuit and the LLC resonant converter provides the output voltage, wherein the magnitude of the output voltage is lower than the intermediate voltage value.

9. An LLC resonant converter receiving an input voltage and providing an output voltage and an output current to a DC load, the output current having a fixed current value, the LLC resonant converter comprising:
a primary side circuit;
an isolation transformer comprising a primary winding and a secondary winding, wherein the primary winding of the isolation transformer is electrically connected with the primary side circuit;
a secondary side circuit comprising a bridge rectifier circuit, a unidirectional power-controllable switch, a voltage detector and a current detector, wherein the bridge rectifier circuit is electrically connected with the secondary winding and comprises a plurality of diodes, the unidirectional power-controllable switch is electrically connected with one of the plurality of diodes in parallel, the voltage detector is configured to detect the output voltage, and the current detector is configured to detect the output current; and
a control circuit for controlling an operation of the LLC resonant converter,
wherein after the LLC resonant converter is enabled, the control circuit drives the LLC resonant converter to be operated in a first modulation mode and turns on the unidirectional power-controllable switch, so that the secondary side circuit provides the output voltage and a magnitude of the output voltage is greater than or equal to an intermediate voltage value, wherein the intermediate voltage is equal to a half of a sum of a predetermined voltage value and N times the predetermined voltage value,
wherein when the LLC resonant converter is enabled and the LLC resonant converter is operated in the first modulation mode, the control circuit determines whether a magnitude of the output current is greater than zero according to a detecting result of the current detector, wherein when the control circuit determines that the magnitude of the output current is not greater than zero, the control circuit drives the LLC resonant converter to be operated in the first modulation mode, wherein when the control circuit determines that the magnitude of the output current is greater than zero, the control circuit determines whether the magnitude of the output voltage is greater than a reference voltage value according to a detecting result of the voltage detector, wherein when the control circuit determines that the magnitude of the output voltage is greater than the reference voltage value, the control circuit drives the LLC resonant converter to be operated in the first modulation mode, wherein when the control circuit determines that the magnitude of the output voltage is lower than or equal to the reference voltage value, the control circuit drives the LLC resonant converter to be operated in a second modulation mode, and the control circuit controls the unidirectional power-controllable switch to be turned off, so that the secondary side circuit provides the output voltage and the magnitude of the output voltage is lower than the intermediate voltage value.

10. An LLC resonant converter for receiving an input voltage and providing an output voltage and an output current to a DC load, the output current having a fixed current value, the LLC resonant converter comprising:
a primary side circuit comprising a switching circuit and a resonance circuit, wherein the switching circuit receives the input voltage, and the switching circuit is electrically connected with the resonance circuit, wherein the switching circuit has a full-bridge circuit comprising four switches;
an isolation transformer comprising a primary winding and a secondary winding, wherein the primary winding of the isolation transformer is electrically connected with the primary side circuit;
a secondary side circuit comprising a bridge rectifier circuit, a voltage detector and a current detector, wherein the bridge rectifier circuit is electrically connected with the secondary winding, the voltage detector is configured to detect the output voltage, and the current detector is configured to detect the output current; and
a control circuit for controlling an operation of the LLC resonant converter,
wherein after the LLC resonant converter is enabled, the control circuit drives the LLC resonant converter to be operated in a first modulation mode, and the control circuit controls switching actions of the four switches in a form of a full-bridge circuitry, so that the LLC resonant converter provides the output voltage, wherein a magnitude of the output voltage is greater than or equal to an intermediate voltage value, and the intermediate voltage is equal to a half of a sum of a predetermined voltage value and N times the predetermined voltage value,
wherein when the LLC resonant converter is enabled and the LLC resonant converter is operated in the first modulation mode, the control circuit determines whether a magnitude of the output current is greater than zero according to a detecting result of the current detector, wherein when the control circuit determines that the magnitude of the output current is not greater than zero, the control circuit drives the LLC resonant converter to be operated in the first modulation mode, wherein when the control circuit determines that the magnitude of the output current is greater than zero, the control circuit determines whether the magnitude of the output voltage is greater than a reference voltage value according to a detecting result of the voltage detector, wherein when the control circuit determines that the magnitude of the output voltage is greater than the reference voltage value, the control circuit drives the LLC resonant converter to be operated in the first modulation mode, wherein when the control circuit determines that the magnitude of the output voltage is lower than or equal to the reference voltage value, the control circuit drives the LLC resonant converter to be operated in a second modulation mode, and the control circuit controls switching actions of the four switches in a form of a half-bridge circuitry, so that the LLC resonant converter provides the output voltage, wherein the magnitude of the output voltage is lower than the intermediate voltage value.

* * * * *